United States Patent
Fujino

(10) Patent No.: US 7,800,567 B2
(45) Date of Patent: Sep. 21, 2010

(54) LED DRIVE CIRCUIT

(75) Inventor: Takashi Fujino, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 744 days.

(21) Appl. No.: 11/685,851

(22) Filed: Mar. 14, 2007

(65) Prior Publication Data

US 2007/0216602 A1 Sep. 20, 2007

(30) Foreign Application Priority Data

Mar. 20, 2006 (JP) .............................. 2006-076896

(51) Int. Cl.
*G09G 3/32* (2006.01)
*G09G 3/14* (2006.01)
(52) U.S. Cl. .......................................... 345/82; 345/39
(58) Field of Classification Search ............. 345/39–83, 345/87–100, 204–214, 690–697
See application file for complete search history.

(56) References Cited

U.S. PATENT DOCUMENTS

| | | | |
|---|---|---|---|
| 4,404,462 A * | 9/1983 | Murray | 219/497 |
| 6,392,358 B1 * | 5/2002 | Runau et al. | 315/185 R |
| 6,466,188 B1 * | 10/2002 | Cato | 345/82 |
| 6,618,406 B1 * | 9/2003 | Kaminishi | 372/38.02 |
| 7,262,752 B2 * | 8/2007 | Weindorf | 345/82 |
| 7,265,681 B2 * | 9/2007 | Chen | 340/815.45 |
| 7,296,913 B2 * | 11/2007 | Catalano et al. | 362/257 |
| 7,468,723 B1 * | 12/2008 | Collins | 345/102 |
| 2005/0243041 A1 * | 11/2005 | Vinn | 345/82 |
| 2006/0022616 A1 * | 2/2006 | Furukawa et al. | 315/309 |

FOREIGN PATENT DOCUMENTS

JP 2001215913 8/2001

* cited by examiner

*Primary Examiner*—Bipin Shalwala
*Assistant Examiner*—Sosina Abebe
(74) *Attorney, Agent, or Firm*—Kenealy Vaidya LLP

(57) ABSTRACT

An LED drive circuit of the disclosed subject matter can include an LED unit and a serial circuit connected in parallel therewith. The serial circuit includes a resistor and a positive temperature coefficient resistor having a positive linear temperature coefficient. A voltage across the positive temperature coefficient resistor is fed back to an output control circuit. An output voltage that is PWM-controlled on the basis of a reference voltage set at the output control circuit is used to drive the LED unit.

12 Claims, 2 Drawing Sheets

| Temperature [°C] | ↗ | ↘ |
|---|---|---|
| Temperature Resistance $R_{TH}$ [Ω] | ↗ | ↘ |
| Output Voltage $V_O$ [V] | ↘ | ↗ |
| LED Drive Current $I_L$ [A] | ↘ | ↗ |

| Temperature [°C] | Temperature Resistance $R_{TH}$ [Ω] | Output Voltage $V_O$ [V] |
|---|---|---|
| −50 | 1020 | 47.1 |
| −25 | 1080 | 44.5 |
| 0 | 1140 | 42.2 |
| 25 | 1200 | 40.2 |
| 50 | 1260 | 38.3 |
| 75 | 1344 | 36.0 |
| 100 | 1416 | 34.2 |

LED DRIVE CIRCUIT

This application claims the priority benefit under 35 U.S.C. §119 of Japanese Patent Application No. 2006-076896 filed on Mar. 20, 2006, which is hereby incorporated in its entirety by reference.

BACKGROUND

1. Field

The disclosed subject matter relates to an LED drive circuit, and particularly to an LED drive circuit capable for a light emitting diode (LED) that maintains a constant brightness even if temperature environments such as ambient temperature and self-exothermicity vary.

2. Description of the Related Art

Performance of a PN-junction bandgap in an LED has temperature dependence and can decrease as the temperature rises. Therefore, the forward voltage of the LED has negative temperature dependence and lowers characteristically as the temperature rises.

When the LED is constant-voltage driven, therefore, an elevation in the temperature at the LED due to the ambient temperature and self-exothermicity can lower the forward voltage and increase the forward current of the LED.

The increased forward current promotes further elevation of the temperature and the forward voltage proceeds lowering. This is a state of positive feedback in terms of power, which can eventually lead to thermal runaway, which is a concern.

To avoid such issues, a method has been proposed in which a constant-current drive is provided for the LED, as shown in the circuit diagram of FIG. 4. In this case, an LED unit LU of circuitry including serially connected n $LED_1$-LEDn is connected serially to a current sense resistor RS, and the other end of the current detection resistor RS is grounded.

An LED drive current IL (current value Il) flowing in the LED unit LU causes a voltage VRS (voltage value Vrs)=Il×Rs across the current sense resistor RS (resistance Rs), which is fed back to a feedback terminal FB of an output control circuit OCC.

A reference voltage Vref is set to the output control circuit OCC, and a difference between the voltage value Vrs of the feedback voltage VRS fed to the feedback terminal FB and the reference voltage Vref is used to control a transistor Q for controlling the output voltage Vo.

This makes it possible to control the LED drive current IL flowing in the LED unit LU connected in parallel with a capacitor C. This feedback control is continued until the voltage value Vrs of the feedback voltage VRS reaches the same potential as the reference voltage Vref. Thus, the LED drive current IL flowing in the LED unit LU can be held constant.

Such feedback technology which keeps constant the value Vrs of the voltage across the current sense resistor RS serially that is connected to the LED unit LU is a current manner in which a step-up DC/DC converter of the so-called constant-current type is configured (see Japanese Patent Application JP 2001-215913A, for example, which is incorporated herein by reference).

From the viewpoint of circuit characteristic, the circuit for constant-current driving the LED unit LU can cause an abnormal elevation in the output voltage Vo (i.e., can cause an overvoltage) at no load (for example, when a malfunction occurs in at least one of the LEDs contained in the LED unit LU resulting in a short across the malfunctioning LED(s) in the circuit). Therefore, a protective circuit can be used to counter this issue. To the contrary, even if the temperature elevation lowers the forward voltage of the LED, the drive circuit comes to a state of negative feedback in terms of power to keep the current IL flowing in the LED constant. Therefore, it advantageously operates to suppress an overcurrent in the LED, preventing the temperature in the LED from elevating due to self-exothermicity, and preventing thermal runaway from occurring.

In general, the output voltage Vo is around 30-50 V though it fluctuates in response to the fluctuation of the forward voltage of the LED because of the constant-current control as described above. The current value Il of the LED drive current IL flowing in the LED unit LU is determined on the basis of the specification required for the LED unit LU. In this case, if a higher brightness is desired, LEDs having a larger absolute maximum rating for forward current can be used in the LED unit. Therefore, the current value is determined to be substantially 0.5-1.0 A.

The above-described related art LED drive circuit is configured to exhibit a larger power loss at the current sense resistor RS and a lower efficiency of power utilization because the current sense resistor RS is connected serially to the LED unit LU.

For example, if the current value Il of the LED drive current IL flowing in the LED unit LU is 0.5 A, and the voltage value Vrs of the feedback voltage VRS placed across the current sense resistor RS is 1 V, then the current value Rs of the current sense resistor RS is given below.

$$Rs = 1/0.5 = 2\Omega$$

Accordingly, the power PRS consumed at the current sense resistor RS is given below.

$$PRS = (IL)^2 \times RS = (0.5)^2 \times 2 = 0.5\ W$$

Therefore, an increase in the current value Il of the LED drive current IL flowing in the LED unit LU in order to develop a higher brightness at the LED unit LU also increases the power PRS consumed at the current sense resistor RS, and increases the power loss correspondingly.

SUMMARY

The disclosed subject matter has been made in consideration of the above and other problems and issues and is directed to an LED drive circuit capable of providing an LED with a constant brightness even when temperature environments such as the ambient temperature and/or self-exothermicity vary. The LED drive circuit does not require the use of a current sense resistor (as used in conventional art circuits) for sensing the feedback voltage, nor an overvoltage protective circuit when operating at no load.

The disclosed subject matter provides an LED drive circuit that can include the following: an LED unit including an LED or a plurality of serially connected LEDs; a circuit including a resistor and a positive temperature coefficient resistor having a positive linear temperature coefficient and serially connected thereto, the circuit being connected in parallel with the LED unit, the positive temperature coefficient resistor and the LED being arranged to share an ambient temperature; an output control circuit; and, a transistor, wherein a voltage across the positive temperature coefficient resistor that is caused by current flowing therein is fed back to the output control circuit, and an output PWM-controlled on the basis of the voltage and a reference voltage set to the output control circuit is used to turn on/off the transistor to control the voltage applied to the LED unit.

In the disclosed subject matter, the voltage, Vo, applied to the LED unit satisfies the following relation (1):

$$Vo=(1+RX/RTH)\cdot Vref \qquad (1)$$

where RX denotes a resistance of the resistor; RTH a temperature resistance of the positive temperature coefficient resistor; and Vref the reference voltage.

The ambient temperature surrounding the LED unit may rise, resulting in a lowering of the forward voltage of the LEDs contained in the LED unit. Even in this case, the LED drive circuit of the disclosed subject matter comes to a state of negative feedback in terms of power that works to lower the voltage for driving the LED unit and reduce the current flowing in the LED unit. Thus, the LED drive circuit is operative to suppress the self-exothermicity of the LED and block the thermal runaway of current.

The LED unit has circuitry with less power consumption and a higher efficiency of power utilization because it requires less current flowing in the positive temperature coefficient resistor.

The LED drive voltage to be controlled is not dependent on the current flowing in the LED unit. Therefore, even if a malfunction occurs in at least one of the LEDs contained in the LED unit LU and makes it short across the malfunctioning LED(s), the LED drive voltage is prevented from abnormally elevating (that is, prevented from causing an overvoltage), and any protective circuit is not required.

DETAILED DESCRIPTION OF EMBODIMENTS

The disclosed subject matter will now be described below in detail with reference to FIGS. 1-3. The below-described embodiment is a specific example of the disclosed subject matter and accordingly is given various technical features, though the scope of the disclosed subject matter is not limited to the embodiments.

Figures 1, 2:
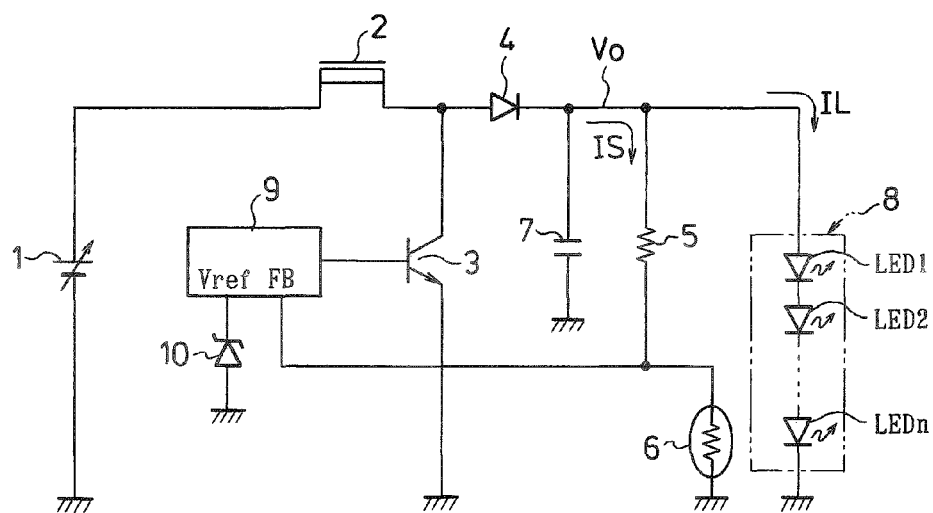
FIG. 1 is a circuit diagram illustrative of an embodiment made in accordance with principles of the disclosed subject matter.
FIG. 2 is a table showing circuit operation phases relative to variations in temperature at the positive temperature coefficient resistor in the embodiment of FIG. 1.

FIG. 1 is a circuit diagram illustrative of an embodiment associated with an LED drive circuit made in accordance with principles of the disclosed subject matter. This circuitry includes a choke coil 2 having one end connected to a DC power source 1 and the other end connected to a collector of an NPN transistor 3 having a grounded emitter and to an anode of diode 4.

A resistor 5 can be provided having one end connected to a cathode of the diode 4 and the other end connected to one end of a positive temperature coefficient resistor 6 whose other end is grounded. The cathode of the diode 4 can be connected to one end of a capacitor 7 (also known as a condenser) whose other end is grounded. The diode 4 can also be connected to the anode side of an LED unit 8 that includes a plurality of serially connected LEDs ($LED_1$-LEDn). The cathode side of the LED unit 8 can be grounded.

The transistor 3 has a base connected to an output control circuit 9. The output control circuit 9 utilizes a separate excitation PMW control system using an error amplifier. A conventionally known circuit may be used for that purpose. The output control circuit is provided with a feedback terminal FB. The feedback terminal FB is connected to a node between the resistor 5 and the positive temperature coefficient resistor 6. A Zener diode 10 can be employed to set a reference voltage Vref.

Operation of the above-described circuit is described below. The transistor 3 is turned on/off by a PWM control signal output from the output control circuit 9. As the transistor 3 is turned on/off, a current flows through the choke coil 2 and the diode 4 (for rectifying) in the capacitor 7 (for smoothing). In this case, the capacitor 7 is charged up to a voltage that is boosted to a level that is higher than the voltage of the DC power supply. The output voltage Vo across the capacitor 7 allows a current IS to flow in the circuit that is connected in parallel with the capacitor 7 and which includes the resistor 5 and the positive temperature coefficient resistor 6 serially connected thereto, and allows a current IL to flow in the LED unit 8. In this case, the resistance of the resistor 5 is denoted with RX and the resistance of the positive temperature coefficient resistor 6 is denoted with RTH.

The voltage, VRS=IS×RTH, caused by the current flowing in the positive temperature coefficient resistor 6 being fed to the feedback terminal FB of the output control circuit 9.

In this case, the output control circuit 9 applies separate excitation PMW control using an error amplifier to PWM-control the output voltage Vo on the basis of the feedback voltage VRS and the reference voltage Vref. Thus, the output voltage Vo and the reference voltage Vref can keep a relationship represented by the following expression (1).

$$Vo=(1+RX/RTH)\cdot Vref \qquad (1)$$

Circuit operation phases relative to variations in temperature at the positive temperature coefficient resistor 6 are shown in FIG. 2. The positive temperature coefficient resistor 6 has a positive linear temperature coefficient. As the temperature at the positive temperature coefficient resistor 6 rises, the temperature resistance RTH of the positive temperature coefficient resistor 6 increases. In this case, the output voltage Vo is lowered to reduce the current value Il of the current IL flowing in the LED unit 8. To the contrary, as the temperature at the positive temperature coefficient resistor 6 falls, the temperature resistance RTH of the positive temperature coefficient resistor 6 decreases. In this case, the output voltage Vo is elevated to increase the current value Il of the current IL flowing in the LED unit 8.

The current flowing in the resistor 5 and the positive temperature coefficient resistor 6 may be on the order of mA. This is because the current flowing from the node between the resistor 5 and the positive temperature coefficient resistor 6 to the feedback terminal FB of the output control circuit 9 works when it is on the order of μA. Accordingly, the power, PXTH, consumed at the resistor 5 and the positive temperature coefficient resistor 6, or the power loss, is calculated as follows on the assumption that RX=47 kΩ, RTH=1.2 kΩ, and Vo=40 V.

$$PXTH = (Vo)^2 / (RX + RTH)$$
$$= (40)^2 / (47/\times 10^3 + 1.2 \times 10^3)$$
$$= (1.6 \times 10^3)/(48.2 \times 10^3)$$
$$= 0.033\,W$$

The LED drive circuit of the conventional art example has a power loss of 0.5 W while the LED drive circuit of the embodiment of FIG. 1 has a power loss of 0.033 W, which is 6.6% of the power loss of the LED drive circuit of the conventional art, which can be considered to be a greatly reduced power loss.

The circuit constants are specifically determined to examine the circuit function. If the positive temperature coefficient resistor 6 has a resistance temperature coefficient of TCR=2400 ($\times 10^{-6}$/K) and, at 25° C., RTH=1.2 kΩ, the resistance of the resistor 5 is RX=47 kΩ, and the reference voltage at the output control circuit 9 is Vref=1.0 V. The relationships shown in FIG. 3 can be derived from the above expression (1).

Figures 3, 4:
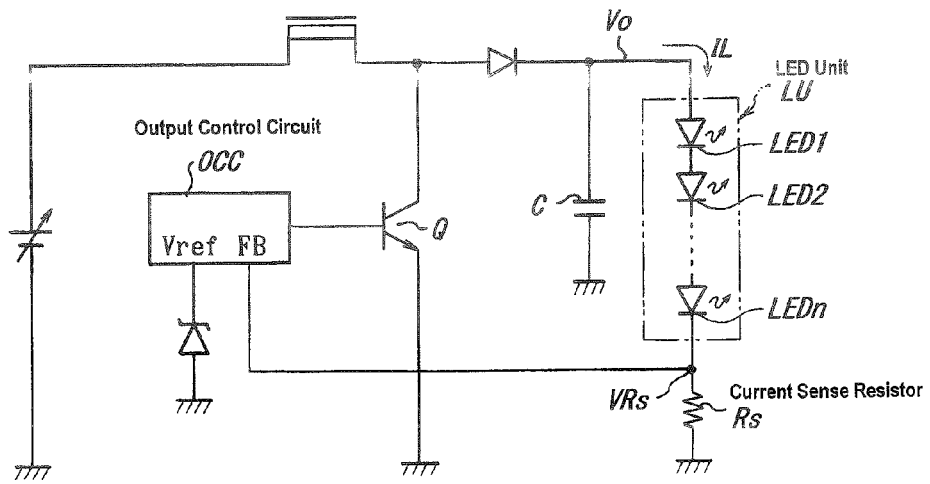
FIG. 3 is a table showing a relationship between the temperature resistance of the positive temperature coefficient resistor and the output voltage relative to variations in temperature at the positive temperature coefficient resistor in the embodiment of FIG. 1.
FIG. 4 is a circuit diagram illustrative of conventional art.

As shown in FIG. 3, when the temperature at the positive temperature coefficient resistor 6 rises, the temperature resistance RTH of the positive temperature coefficient resistor 6 increases and leads to a lowered output voltage. Therefore, this negative feedback works to lower the forward voltage of the individual LEDs contained in the LED unit 8 to suppress the current flowing in the LEDs, preventing thermal runaway of the current flowing in the LED unit 8.

As obvious from the expression (1), the output voltage Vo is not dependent on the state of the load (LED unit) and can be determined from the temperature resistance RTH of the positive temperature coefficient resistor 6 and the reference voltage Vref to the output control circuit 9. Accordingly, even at no load (for example, when a malfunction occurs in at least one of LEDs contained in the LED unit 8 resulting in a short across the malfunctioning LED(s) in the circuit), the output voltage Vo does not abnormally elevate (causes no overvoltage), and thus a protective circuit is not required.

The positive temperature coefficient resistor 6 is arranged in the vicinity of the LEDs contained in the LED unit 8 to share the ambient temperature surrounding the LEDs. Therefore, the temperature environment to which the LEDs are exposed can be precisely reflected in feedback to achieve a reliable current control.

Compared to the current value IL of the current IL flowing in the LED unit 8, the current value IS of the current IS flowing in the serial circuit including the resistor 5 and the positive temperature coefficient resistor 6 is much smaller (IS<<IL). Therefore, there is no harm in considering that the output voltage Vo is used to control only the current IL flowing in the LED unit 8.

As described above, the LED drive circuit of the disclosed subject matter can include an LED unit and a serial circuit connected in parallel therewith. The serial circuit includes a resistor and a resistance temperature sensor having a positive linear temperature coefficient. A voltage across the positive temperature coefficient resistor is fed back to the output control circuit. An output PWM-controlled on the basis of a reference voltage set to the output control circuit is used to control the voltage for driving the LED unit.

As a result, even if the ambient temperature surrounding the LED unit elevates and lowers the forward voltage of the LEDs contained in the LED unit, a negative feedback in terms of power works to lower the voltage for driving the LED unit and to reduce the current flowing in the LED unit. Thus, the LED drive circuit is operative to suppress the self-exothermicity of the LED and to block thermal runaway of current.

In addition, the circuitry has less power consumption and a higher efficiency of power utilization because it requires less current flowing in the positive temperature coefficient resistor.

The LED drive voltage PWM-controlled by the output control circuit is not dependent on the current flowing in the LED unit. Therefore, even if a malfunction occurs in at least one of the LEDs contained in the LED unit and results in a short across the malfunctioning LED(s) in the circuit, the LED drive voltage is prevented from abnormally elevating (that is, causing an overvoltage), and a protective circuit at a no load condition is not required. Thus, it is possible to exert these and other excellent effects.

What is claimed is:

1. An LED drive circuit, comprising:
    an LED unit including at least one of an LED and a plurality of serially connected LEDs;
    a circuit including a resistor serially connected to a positive temperature coefficient resistor, the circuit being connected in parallel with the LED unit, the positive temperature coefficient resistor and the LED unit being configured to share an ambient temperature;
    an output control circuit; and
    a transistor,
    wherein, during operation, a voltage across the positive temperature coefficient resistor caused by current flowing in the positive temperature coefficient resistor is fed back to the output control circuit, and an output that is PWM-controlled on the basis of the voltage and a reference voltage set at the output control circuit is used to turn on/off the transistor to control a voltage, Vo, applied to the LED unit.

2. The LED drive circuit according to claim 1, wherein the voltage, Vo, applied to the LED unit satisfies the following relation (1):

$$Vo = (1 + RX/RTH) \cdot Vref \quad (1)$$

where RX denotes a resistance of the resistor; RTH a temperature resistance of the positive temperature coefficient resistor; and Vref the reference voltage.

3. The LED drive circuit according to claim 1, wherein the power consumed at the resistor and the positive temperature coefficient resistor is calculated using the following relation:

$$PXTH = (Vo)^2/(RX + RTH)$$

where RX is the resistance of the resistor, RTH is the resistance of the temperature sensor, and PXTH is the power consumption.

4. The LED drive circuit according to claim 1, further comprising:
    a capacitor connected in parallel with the LED unit.

5. The LED drive circuit according to claim 4, wherein the resistor, the LED unit, the transistor, and the capacitor are all connected in parallel with each other.

6. An LED drive circuit, comprising:
    an LED unit including at least one of an LED and a plurality of serially connected LEDs;
    a circuit including a resistor serially connected to a positive temperature coefficient resistor, the circuit being connected in parallel with the LED unit;
    a capacitor connected in parallel with the LED unit; and
    an output control circuit and a transistor connected in parallel with the LED unit, wherein, during operation, a voltage across the positive temperature coefficient resistor is fed back to the output control circuit, and an output that is PWM-controlled on the basis of the voltage and a reference voltage is used to turn on/off the transistor to control a voltage, Vo, applied to the LED unit.

7. The LED drive circuit according to claim 6, wherein the voltage, Vo, applied to the LED unit satisfies the following relation (1):

$$Vo=(1+RX/RTH)\cdot Vref \quad (1)$$

where RX denotes a resistance of the resistor; RTH a temperature resistance of the positive temperature coefficient resistor; and Vref the reference voltage.

8. The LED drive circuit according to claim 6, wherein the power consumed at the resistor and the positive temperature coefficient resistor is calculated using the following relation:

$$PXTH=(Vo)^2/(RX+RTH)$$

where RX is the resistance of the resistor, RTH is the resistance of the positive temperature coefficient resistor, and PXTH is the power consumption.

9. The LED drive circuit according to claim 6, wherein the capacitor is connected in parallel with the resistor.

10. The LED drive circuit according to claim 6, wherein the resistor, the LED unit, the transistor, and the capacitor are all connected in parallel with each other.

11. The LED drive circuit according to claim 1, wherein the positive temperature coefficient resistor comprises a positive linear temperature coefficient.

12. The LED drive circuit according to claim 6, wherein the positive temperature coefficient resistor comprises a positive linear temperature coefficient.

* * * * *